United States Patent [19]

Galvagni et al.

[11] Patent Number: 5,799,379
[45] Date of Patent: Sep. 1, 1998

[54] METHOD OF MANUFACTURING A DECOUPLING CAPACITOR STRUCTURE

[75] Inventors: John Galvagni, Myrtle Beach, S.C.; Richard Gerald Murphy, Binghamton; George John Saxenmeyer, Apalachin, both of N.Y.

[73] Assignee: International Business Machines Corporation, Armonk, N.Y.

[21] Appl. No.: 446,247

[22] Filed: May 22, 1995

Related U.S. Application Data

[62] Division of Ser. No. 277,791, Jul. 20, 1994, Pat. No. 5,517,385, which is a continuation of Ser. No. 978,794, Nov. 19, 1992, abandoned.

[51] Int. Cl.[6] .......................................... H01G 4/20
[52] U.S. Cl. .................... 29/25.42; 361/306.2; 361/312; 361/313
[58] Field of Search ..................... 29/25.42; 361/306.2, 361/312, 313, 328–330, 321.1–321.5

[56] References Cited

U.S. PATENT DOCUMENTS 2,549,424  4/1951  Carlson et al. .
2,648,804  8/1953  Steigerwalt et al. ............... 361/312 X Primary Examiner—Carl E. Hall
Attorney, Agent, or Firm—Douglas M. Clarkson

[57] ABSTRACT

A capacitor structure is described as having a plurality of dielectric materials located so that each dielectric material is in parallel between capacitor plates. The capacitor value of this structure is preset, therefore, for operation electrically at different specific temperatures. The description gives a specific stacked arrangement for the various dielectric materials in which this capacitor can be formed, as one example of that to which it is adaptable.

5 Claims, 3 Drawing Sheets

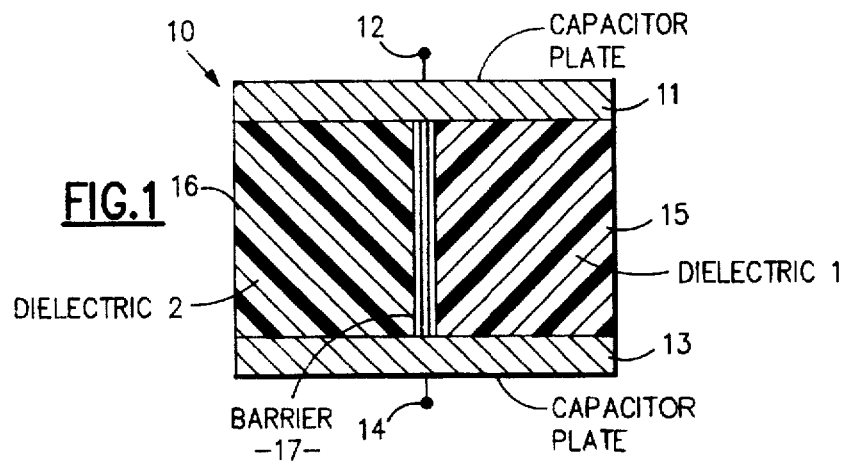
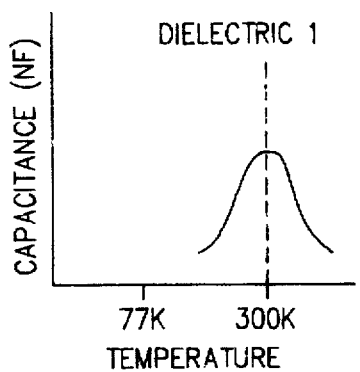 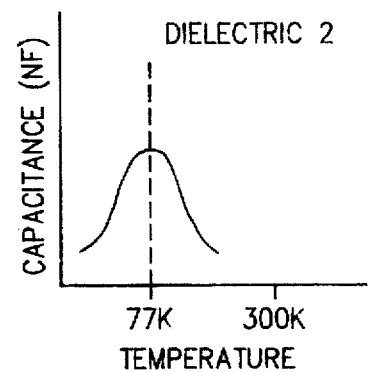
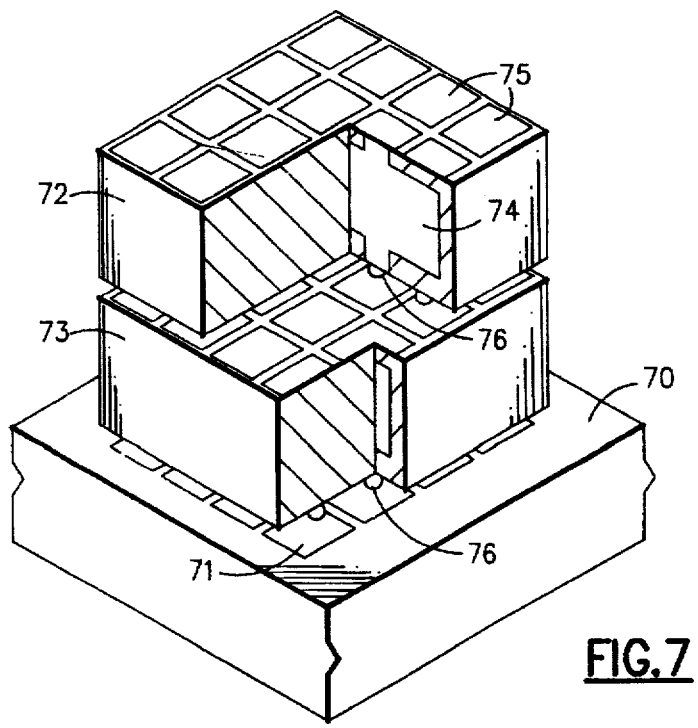

METHOD OF MANUFACTURING A DECOUPLING CAPACITOR STRUCTURE

This is a division of Ser. No. 08/277,791 Jul. 20, 1994, now U.S. Pat. No. 5,517,385 granted May 14, 1996 which is a continuation of Ser. No. 07/978,794 filed Nov. 19, 1992, now abandoned.

BACKGROUND OF THE INVENTION

The present invention, generally, relates to electrical capacitor structures and, more particularly, to a new and improved structural arrangement for a capacitor which admits of functioning in a wider temperature range than prior structures.

In the past, no single capacitor could be used in an environment that involved wide temperature variations. It is known that changes in operating temperature can produce changes in the value of a capacitor.

Also, there is a continuing effort in the data processing field to develop equipment having less cost, greater operating speed and smaller size. The need for smaller sizes of capacitors produces a nagging problem in the microelectronics area today, because there are so many capacitors needed, and the problem arises due to the need to use two capacitors in order to cover the wider ranges of environmental temperatures to which computer systems are exposed today.

In today's systems, a single capacitor that is required for operation in an environment that involves a temperature range, from the higher temperature of today's data processing circuits down to the much colder cryogenic circuits, can fall short in its operation. Usually, a single capacitor in this environment will be replaced with two capacitors, producing an undesirable duplication in that more space is required for two capacitors.

Modern ferroelectric chip capacitors have made it possible to produce capacitor values ranging from a few picofarads to a few microfarads requiring much less spacial size than is possible using non-ferroelectric material. However, it has been found that the dielectric constant of such ferroelectric capacitors changes appreciably in response to changes in ambient temperature.

Microelectronic components used in high frequency operating circuit environments, particularly used in the switching of integrated circuits, can produce transient energy being coupled into other, unwanted circuit areas. This can be avoided by using a decoupling capacitor across the current source. Even the beneficial effects of a decoupling capacitor connected in this circuit can be affected adversely when temperature variations produce changes in the value of the capacitor.

An example of an early attempt at developing a decoupling capacitor with a better stability in a high frequency noise environment is the multilayer construction described in U.S. Pat. No. 4,667,267 to Hernandez et al. While the structure described in that patent may be effective to accomplish the purpose intended, it states that the decoupling capacitor of that structural arrangement is affected adversely and the value of the capacitor becomes unstable as temperature changes.

In U.S. Pat. No. 4,706,162, Hernandez et al. describes different constructions for a multilayer capacitor in order to overcome difficulties with inductance and to fit within a small space in an integrated circuit. Here, again, it is admitted that capacitance values change as temperature changes, and the decoupling capacitor is affected adversely, becoming unstable, as temperature changes.

U.S. Pat. No. 4,831,494 to Arnold et al., which is assigned to the same Assignee as the present invention, describes a multilayer capacitor structure that reduces the internal inductance even further, is smaller in size and is adapted to easier manufacturing techniques. However, it is not concerned with capacitor functioning effectively over a wide range of operating temperatures.

OBJECTS AND SUMMARY OF THE INVENTION

Accordingly, it is an object of the present invention to provide a structural arrangement for a decoupling capacitor which provides substantially stable functioning over a wider range of operating temperature.

It is also an object of the present invention to provide multiple dielectric materials within the same capacitive unit for maintaining decoupling effectiveness over a wide range of operating temperatures.

Briefly, a decoupling capacitor structure in accordance with the present invention includes two capacitor plates and at least two dielectric materials having predetermined dielectric constants that are different from each other and arranged so that each dielectric material is connected electrically with each of the capacitor plates.

The above, other and further objects, advantages and features of the present invention will become more readily apparent from the following detailed description of the presently preferred embodiment as illustrated in the accompanying drawings.

BRIEF DESCRIPTION OF THE DRAWINGS

FIG. 1 is an illustration of a typical capacitor constructed and arranged according to the present invention.

FIG. 2 is a curve illustrating capacitive characteristics vs. temperature for one dielectric in FIG. 1.

FIG. 3 is a curve illustrating capacitive characteristics vs. temperature for another of the dielectrics in FIG. 1.

FIG. 7 is a view in perspective illustrating diagrammatically an arrangement of a capacitor of the invention.

DETAILED DESCRIPTION OF THE INVENTION

Figure 4:
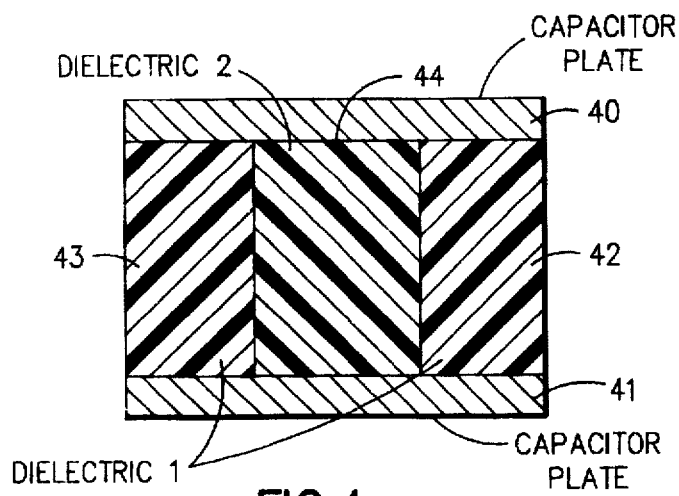
FIG. 4 is an illustration of a capacitor structure that is arranged in accordance with a modification of the invention.

FIG. 1 shows a typical capacitor constructed in accordance with the principles of the present invention and is identified generally by the reference numeral 10. One capacitor plate 11 has an electrical connection 12, and a second capacitor plate 13 has a connection 14, by which the capacitor 10 is connected both electrically and operatively in an electrical circuit.

Present day ferroelectric materials have made it possible to construct electrical capacitors with values that range from a few picofarads to values measured in microfarads that take up much less spatial volume than is possible using nonferroelectric, solid, dielectric materials. However, even though these ferroelectric materials, as available today, solve the problem relating to smaller spaces, they have a tendency to change their dielectric constants appreciably in response to changes in temperature.

However, in accordance with the present invention, a capacitor 10 is constructed to enclose multiple dielectric materials 15 and 16 within the same capacitive unit, and it has been discovered that an arrangement of these dielectric materials in accordance with the invention permits the capacitor 10 to maintain a decoupling effectiveness over a wide range of temperature changes, even from 77K to 300K, without a need to change components.

In other words, a capacitor 10 constructed in accordance with the invention provides the capability of providing a more nearly constant value of capacitance over wide variations in temperature than with prior capacitors.

In FIG. 1, a first dielectric material 15 can be, for example, barium titanate, or $BaTiO_3$, which permits effective decoupling at 300K, or at room temperature, and a second dielectric material 16 can be, for example, strontium titanate, or $SrTiO_3$, which permits effective decoupling at 77K, which is the temperature of liquid nitrogen. FIG. 2 and FIG. 3 illustrate the change in capacitance characteristics with change in temperature for these two dielectric materials.

The first and second dielectric materials 15 and 16 are positioned adjacent each other and joined by a conventional joining process, such as, for example, adhesive bonding or a co-firing process. This joining is illustrated in FIG. 1 by a barrier 17. The same capacitor plates 11 and 13 are common to both dielectric materials 15 and 16, in accordance with the invention, which connects the dielectric materials in parallel electrically.

The generally accepted relationship to determine the value of capacitance is as follows:

$$C = \frac{KA}{T} \quad (1)$$

where:

C=capacitance;
K=dielectric constant;
A=electrode area; and
T=dielectric thickness.

To determine the total capacitance between capacitor plates for a capacitor such as FIG. 1 in accordance with the invention, a relationship as follows is used:

$$C = \frac{K_1 A_1}{T} + \frac{K_2 A_2}{T} \quad (2)$$

where:

C=the total capacitance;
$K_1$=dielectric constant for dielectric 1;
$K_2$=dielectric constant for dielectric 2;
T=dielectric thickness;
$A_1$=electrode area with dielectric 1; and
$A_2$=electrode area with dielectric 2.

A dielectric barrier, such as the barrier 17, FIG. 1, is used to prevent a diffusion of dielectric materials during firing, when a manufacturing process is used that involves a firing of the materials to fabricate the capacitor. Such a firing can cause a diffusion between the two dielectric materials, thereby producing a third dielectric material of unpredictable value, and therefore, the total capacitance value of the capacitor becomes unpredictable.

FIG. 4 of the drawings illustrates another form of construction for a capacitor that utilizes the features of the present invention. This arrangement has capacitor plates 40 and 41 and dielectric 1 divided into two parts 42 and 43 positioned on opposites of dielectric 2 that is identified also by the reference numeral 44.

To understand and appreciate the reason for dividing one of the dielectric materials this way, note that in relationship (2) above, the areas $A_1$ and $A_2$ are two of the variables. Therefore, a larger proporation of the electrode area will accommodate more volume of either of the dielectric materials.

Figure 5:
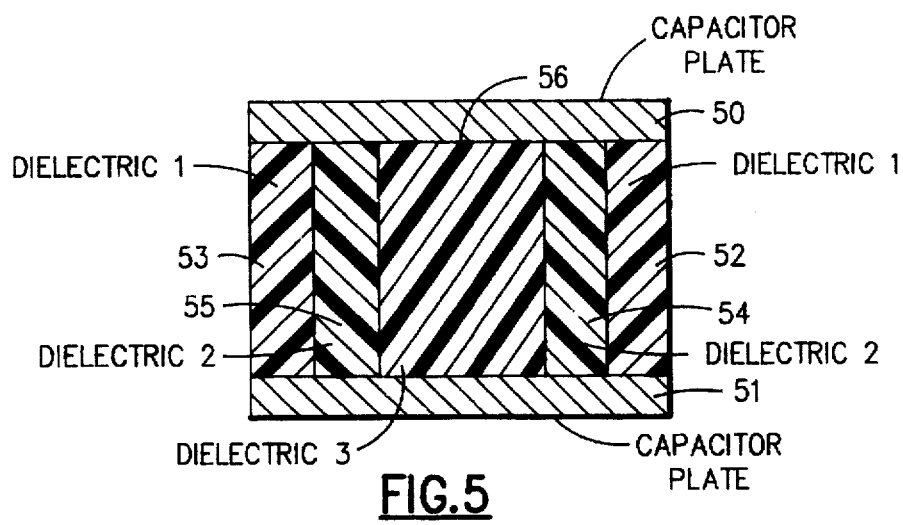
FIG. 5 is an illustration of a further modified structure of the capacitor of the present invention.

FIG. 5 illustrates a different arrangement of the capacitor of the invention where plates 50 and 51 have dielectric 1 divided into parts 52 and 53 and dielectric 2 divided into parts 54 and 55 with a third dielectric 3 positioned in the middle and identified by the numeral 56. Even with multiple dielectric materials, it should be observed that each dielectric material is in contact with each of the capacitor plates, thereby forming electrically one capacitive value for each dielectric material, as illustrated by FIGS. 2 & 3 of the drawings.

The division of dielectric materials into multiple parts has no adverse effect for the capacitance value between the plates. But with an arrangement according to the invention, i.e., each dielectric material of whatever kind being in contact electrically with both capacitor plates, there is no limitation to making the capacitor by any particular process.

Therefore, it will be understood that the capacitor of the invention may have any number of dielectric materials between the capacitor plates, depending upon the temperatures at which the capacitor is to function effectively, and the arrangement of these dielectric materials is such that they each are in contact electrically with the capacitor plates. Any division of the dielectric materials is dependent upon the particular manufacturing process that is used.

Figure 6:
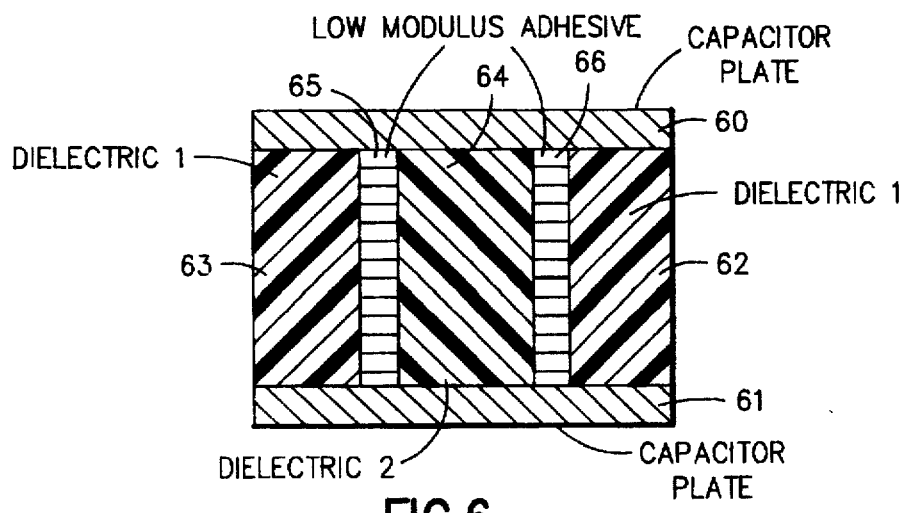
FIG. 6 illustrates another method of manufacturing the capacitor arrangement of FIG. 4.

FIG. 6 illustrates the capacitor arrangement of the present invention with multiple dielectric materials when a firing process is not used. In this instance, the capacitor plates are identified by the numerals 60 and 61, and a first dielectric material is identified by the numerals 62 and 63. A second dielectric material 64 is positioned to be in electrical contact with both capacitor plates 60 and 61, which is a parallel arrangement with the dielectric material 62 and 63.

A low modulus adhesive 65 and 66 separates the respective dielectric materials, as illustrated by FIG. 6.

With a capacitor structure in accordance with the invention, an arrangement as shown in perspective in FIG. 7 illustrates the flexibility that is available. In this stacked capacitor, or it may be called a "piggy back" capacitor, arrangement, a substrate 70 is shown with pads 71 arranged according to a needed connection for connecting a circuit, not visible, with a decoupling capacitor to function effectively at a particular temperature.

The capacitor of the invention, as illustrated in FIG. 1, is constructed in the arrangement of FIG. 7, with a first dielectric material 72 and a second dielectric material 73 with capacitor plates 74 arranged in electrical contact with respective pads 75 and bumps 76. With the capacitor of the invention constructed in this manner, any number of levels of different dielectric materials can be formed according to the capacitance value needed for a circuit function.

Figure 8:
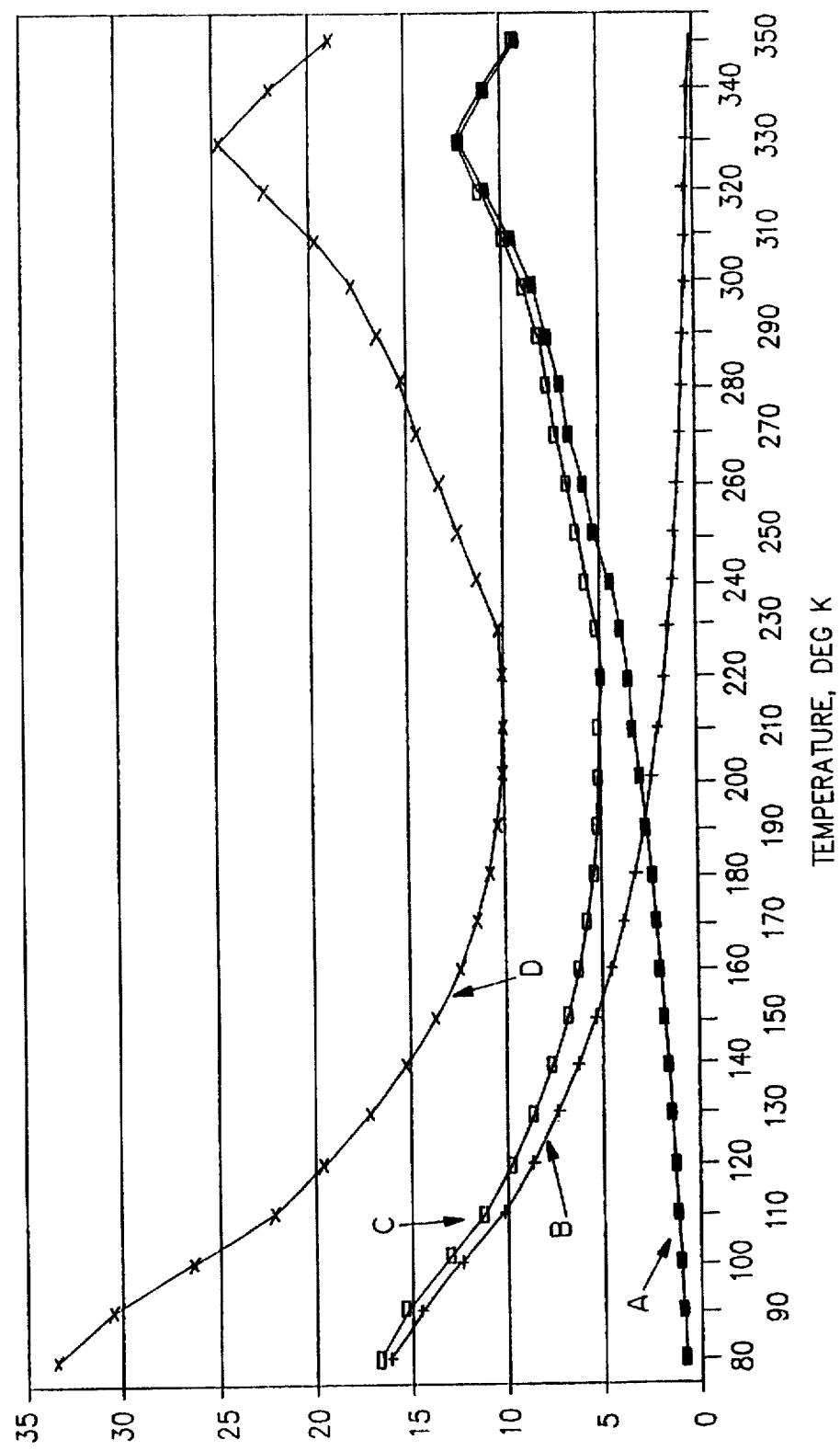
FIG. 8 is a curve showing the variations of capacitance values vs. temperature for four different combinations of dielectric materials as an aid in describing the invention.

FIG. 8 shows several curves of particular capacitance values of ferroelectric chip capacitors that are constructed in accordance with the invention, i.e., a single capacitor capable of functioning effective at two different temperatures. Curve A shows capacitance vs. temperature using a single dielectric alone, such as Barium Titanate, which provides effective capacitance in the 300K area, and curve B shows capacitance vs. temperature using only a single dielectric material, such as Strontium Titanate, which gives an effective capacitance in the 77K area.

Curve C shows capacitance vs. temperature for two dielectric materials, such as those identified above, co-fired in an arrangement according to the present invention as shown in FIG. 1 and illustrating that an effective capacitance value is provided at both the 77K and 300K areas. Curve D shows capacitance vs. temperature using the same two dielectric materials but in the particular arrangement shown in FIG. 7, termed "Piggy Back" or perhaps more accurately, a "stacked" arrangement.

While the invention has been illustrated and described with reference to presently preferred embodiments, it is understood that one skilled in this art having the foregoing description will be able to make modifications and changes, but it is understood also that the present invention is not limited to the described embodiments, but rather, the invention is limited only by the scope of the claims appended hereto.

What is claimed is:

1. A method of manufacturing an electrical capacitor for operating effectively as a decoupling capacitor at two different and spaced apart temperatures, comprising the steps of:

calculating a total capacitance value for a decoupling capacitor;

calculating an electrode area to be represented by a first capacitor plate;

calculating an electrode area to be represented by a second capacitor plate;

calculating the desired thickness of a first dielectric member comprising a first material with a capacitance value at a first temperature;

calculating the desired thickness of a second dielectric member comprising a second material with a capacitance value at a second temperature different from said first temperature;

locating said first dielectric member of said first value between said first and second capacitor plates so that said first dielectric member is in electrical contact with both of said capacitor plates;

locating said second dielectric member of said second value between said first and second capacitor plates so that said second dielectric member is also in electrical contact with both of said capacitor plates; and locating a barrier having predetermined characteristics between said first and said second dielectric members;

whereby said first material and said second material are prevented from intermingling to create a third material of unknown dielectric characteristics.

2. A method as defined by claim 1 wherein said first material is selected by a first predetermined dielectric constant to provide a predetermined capacitance value at a first predetermined temperature.

3. A method as defined by claim 1 wherein said second material is selected by a second predetermined dielectric constant to provide a predetermined capacitance value at a second predetermined temperature.

4. A method as defined by claim 1 wherein said material of said first dielectric member is selected by a first predetermined dielectric constant to provide a predetermined capacitance value at a first predetermined temperature, and said material of said second dielectric member is selected by a second predetermined dielectric constant to provide a predetermined capacitance value at a second predetermined temperature.

5. A method as defined by claim 1 wherein said barrier separating said first and said second dielectric members is a predetermined low modulus material to prevent said intermingling of said first and second materials.

* * * * *